United States Patent [19]

Jordan

[11] 4,135,393

[45] Jan. 23, 1979

[54] TENSIOMETER

[76] Inventor: Donald J. Jordan, 113 Evergreen La., Glastonbury, Conn. 06033

[21] Appl. No.: 876,921

[22] Filed: Feb. 14, 1978

[51] Int. Cl.² ............................................. G01L 5/06
[52] U.S. Cl. .................................................. 73/144
[58] Field of Search ........................... 73/144, 143, 139

[56] References Cited
U.S. PATENT DOCUMENTS

| 3,672,214 | 6/1972 | Yasuda ................................ 73/144 |
| 3,679,808 | 7/1972 | Rohner et al. ..................... 73/144 |

Primary Examiner—Jerry W. Myracle

[57] ABSTRACT

A tensiometer, for measuring the tension of elongated flexible articles, has a frame member, one portion of which defines a scale and a second portion of which supports a fulcrum spaced from the scale, and a spring member for applying a predetermined force to the fulcrum. The elongated flexible article bends about the fulcrum portion of the frame and, in so doing, defines a movable output member which cooperates with the scale to provide a reading.

11 Claims, 1 Drawing Figure

U.S. Patent  Jan. 23, 1979  4,135,393
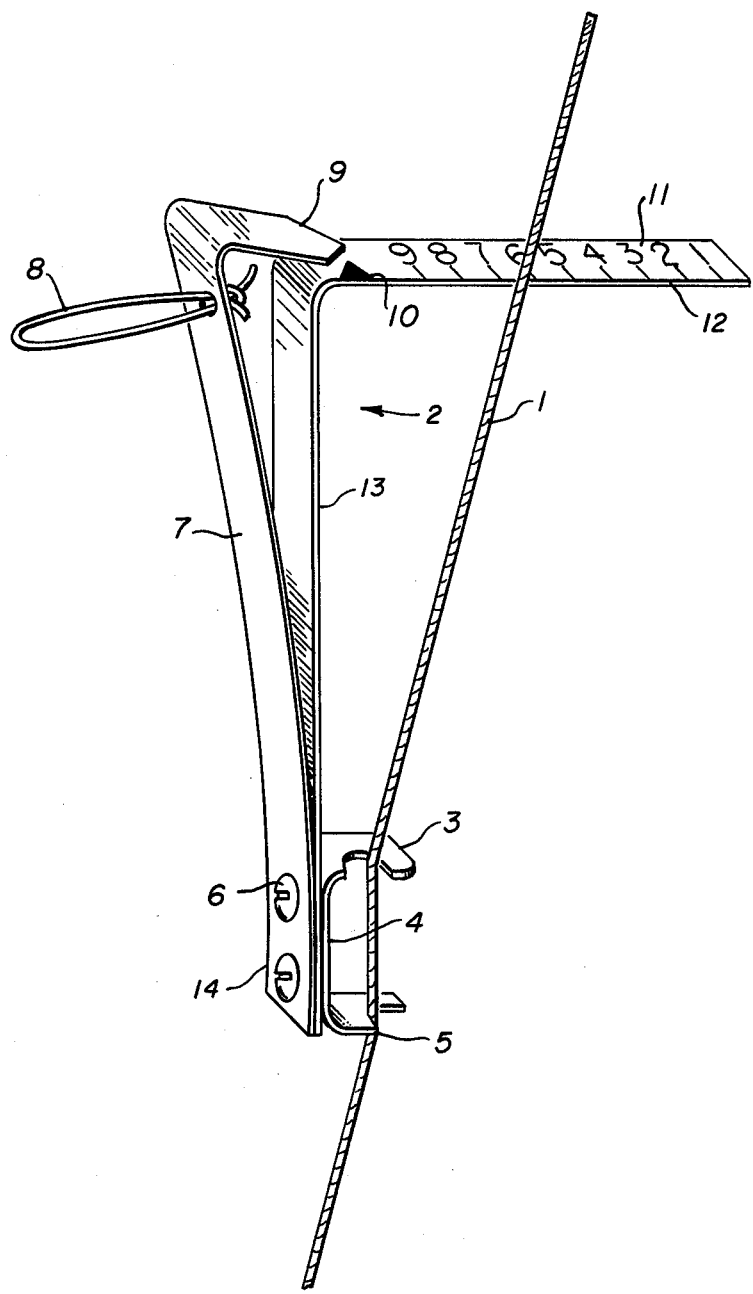

TENSIOMETER

BACKGROUND OF THE INVENTION (1) Field of the Invention

This invention relates to apparatus for measuring tension in elongated flexible articles such as cable, wire, belts, strap and the like. The apparatus has particular applicability in measuring the tension of wire used to support masts on sail boats.

(2) Description of the Prior Art

There are many tensiometers known in the art for measuring the tension of an elongated flexible article. In general, prior art tensiometers include a fulcrum about which the elongated flexible article bends and further include devices for measuring the deflection of the elongated flexible article produced by bending about the fulcrum. In such apparatus, the deflection of the elongated flexible article is measured by a movable output member such as a pointer aligned with a scale as is disclosed in U.S. Pat. Nos. 1,591,631; 1,694,509; 3,203,235 and 3,608,371. These patents disclosed complex and expensive mechanisms for moving the output member across the scale to indicate the tension in the elongated flexible article.

It is an object of the present invention to provide a simplified and inexpensive tensiometer.

It is another object of the present invention to provide a tensiometer which avoids the use of complex and elaborate movable output members to measure the deflection of the elongated flexible article.

It is another object of the present invention to provide a tensiometer that is essentially frictionless and which can be mass produced so that each unit will have a consistent calibration.

SUMMARY OF THE PRESENT INVENTION

The present invention provides a tensiometer for measuring the tension of elongated flexible articles such as cable, wire, belts and straps comprising a fulcrum for providing a point about which the flexible article can bend. The tensiometer of the present invention also includes means for applying a predetermined force to the fulcrum, the force being capable of bending the elongated flexible article, and a scale associated with the fulcrum to measure the deflection of the elongated flexible article with respect to the fulcrum. Thus, in accordance with the invention, the elongated flexible article defines a movable output member which cooperates with the scale to provide a reading.

In one preferred embodiment of the invention the tensiometer comprises an elongated L-shaped frame member. One portion of the L-shaped frame member defines a scale and a second portion of the L-shaped frame member supports a fulcrum which is spaced from the scale. A spring member has one end mounted on the second portion of the L-shaped frame member and includes a pointer at its free end which cooperates with the scale to impose a predetermined force on the fulcrum when the spring is flexed so that the pointer at the free end of the spring deflects a predetermined distance with respect to the scale.

DESCRIPTION OF THE DRAWING

The FIGURE is a perspctive view of the tensiometer of the present invention. The FIGURE shows the spring in the flexed position.

DETAILED DESCRIPTION OF THE INVENTION

FIG. 1 shows a tensiometer for measuring the tension of a cable or wire 1. It should be understood that the tensiometer of the present invention is capable of measuring the tension of elongated flexible articles such as cable, wire, belts, and straps and the like. The tensiometer includes L-shaped frame member 2 including a first portion which defines a scale 11 and a second portion which supports, at one end thereof, a guide 4. Guide 4 is spaced from scale 11 by the second portion of frame member 2 and is secured to frame member 2 by screws 6 or any other suitable attachment technique. In the disclosed embodiment guide 4 is made of sheet metal bent upwardly to form a channel or a U. The upper end of channel 4 is shaped to provide a hook 3. Hook 3 engages wire 1 and functions as a fulcrum about which wire 1 can bend. The lower end of channel 4 includes notch 5 shaped to also engage wire 1. It should be understood that it is preferred that channel 4 include notch 5, but that the tensiometer is capable of functioning without the lower end of channel 4 and notch 5.

To measure the tension in wire 1, the tensiometer is engaged with wire 1 by hook 3. A predetermined force is applied to wire 1 at hook 3 by an L-shaped spring 7 which is shown in the FIGURE in the deflected position. L-shaped spring 7 has one end mounted on the second portion of L-shaped frame member 2 and includes a pointer 9 at its free end. Pointer 9 cooperates with calibration mark 10 on scale 11. When pointer 9 is aligned with calibration mark 10 on scale 11, the free end of spring 7 has moved a predetermined distance which, in turn, defines the predetermined force which bends wire 1 at hook 3. A reading is then taken by noting the point at which wire 1 crosses scale 11. As shown in the FIGURE this would be a reading of 6.4. Thus, in the tensiometer of the present invention wire 1 defines a movable output member which cooperates with scale 11 to provide a reading. The amount that wire 1 is deflected is approximately inversely proportional to the tension in wire 1; i.e., a wire having a high tension will bend less than a wire having a low tension. The amount that the wire deflects is measured by noting the position of wire 1 relative to (along) scale 11. By suitably calibrating scale 11, an accurate determination of the tension of wire 1 can be obtained. A loop 8 which can be fabricated from nylon or some other material resistant to wear is fixed to spring 7 and provides a means for applying force thereto It should be understood that the tensiometer of the present invention avoids the use of complicated output members for measuring the tension of the wire.

The tensiometer of the present invention has a structure which is relativey uncomplicated compared to the prior art and which allows for inexpensive mass production of the device. It is preferred that L-shaped frame member 2 be made of rigid metal strips bent in the shape of an L and that spring 7 be made of a metal strip manufactured with a point at one end and bent in the shape of an L.

Spring 7 is the particularly preferred means of applying a predetermined force to hook 3. Other means of applying a predetermined force to hook 3 can be used, such as a conventional cylindrical wire spring which is pulled through a predetermined distance.

Although frame member 2 is shown in an L-shape, it should be understood that frame member 2 functions as a means for providing a scale 11 which is spaced from hook 3 so that the deflection of wire 1 can be measured. Thus frame member 2 can have a shape other than an L-shape. Although scale 11 is shown as having a flat planar shape, it should be understood that scale 11 can be curved or have another shape which allow the scale to cooperate with wire 1 to provide a reading.

It should also be noted that the second portion of frame member 2 functions to space scale 11 from hook 3 and to fix hook 3 with respect to scale 11. Means other than a flat planar metal plate may be used for member 2 and hook 3 may be integral with member 2.

While a preferred embodiment has been shown and described, various modifications and substitutions may be made thereto without departing from the spirit and scope of the invention. Accordingly, it will be understood that the present invention has been described by way of illustration and not limitation.

What is claimed is:

1. A tensiometer for measuring the tension of an elongated flexible article such as cable, wire, belts or strapping comprising:
   fulcrum means for providing a place about which said elongated flexible article can bend;
   means for applying a predetermined force to said fulcrum means, the force capable of deflecting the elongated flexible article; and
   scale means associated with said fulcrum means to measure the deflection of said elongated flexible article with respect to the fulcrum means, said elongated flexible article defining a movable output member which cooperates with said scale means to provide a reading.

2. A tensiometer according to claim 1 wherein said scale means includes an L-shaped frame member, one portion of the L-shaped frame member defining a scale, the second portion supporting said fulcrum means, said fulcrum means being spaced away from said scale and providing a point about which the elongated flexible article can bend.

3. A tensiometer according to claim 2 wherein said means for applying a predetermined force includes a spring member having one end mounted on the second portion of the L-shaped frame member and includes a free end capable of movement away from said second portion of said frame member a predetermined distance.

4. A tensiometer according to claim 3 wherein said spring is L-shaped and includes a pointer at its free end which cooperates with a calibration mark on said scale to define the predetermined distance.

5. A tensiometer according to claim 4 wherein said fulcrum means includes a hook mounted on the second portion of said frame member and adapted to engage the elongated flexible article and bend the elongated flexible article when said predetermined force is imposed.

6. A tensiometer comprising a frame member having a first portion defining a scale and a second portion supporting fulcrum means, said frame member first and second portions being joined at first ends and being angularly related, said fulcrum means being spaced away from said scale by said second portion and providing a place about which an elongated flexible article engaged by said fulcrum means can bend, said fulcrum means extending outwardly from said frame member second portion generally in the same direction as said frame member first portion, means for applying a predetermined force to said fulcrum means to provide for bending of an elongated flexible article engaged thereby said elongated flexible article defining a movable output member which cooperates with said scale to provide a reading.

7. A tensiometer according to claim 6 wherein said frame member is generally L-shaped and wherein said means for applying a predetermined force includes a spring member having one end mounted on the second portion of L-shaped frame member and a free end capable of movement away from said second portion a predetermined distance.

8. A tensiometer according to claim 7 wherein said spring member is generally L-shaped and includes a point at its free end which cooperates with a calibration mark on said scale to define a predetermined distance.

9. A tensiometer according to claim 8 wherein said fulcrum means includes hook means mounted on said second portion of said L-shaped frame.

10. A tensiometer according to claim 9 wherein said fulcrum means further includes a guide which is provided with a hook at one end and a rest or platform at the other end of the guide dimensioned so that the elongated flexible article can fit within the hook and bear on the rest.

11. The tensiometer according to claim 9 wherein said means for applying force further includes grip means engaging said spring member adjacent the junction of said one and free ends thereof, said grip means being adapted for manipulation to apply a bending mount to said spring member.

* * * * *